June 7, 1938.  C. FERREL ET AL  2,119,634
SPARK PLUG TESTING DEVICE
Filed July 1, 1937   2 Sheets-Sheet 1

INVENTORS
CHARLES FERREL.
JOSEPH G. COLLING.
BY Altach & Knoblock
ATTORNEYS.

June 7, 1938.  C. FERREL ET AL  2,119,634
SPARK PLUG TESTING DEVICE
Filed July 1, 1937   2 Sheets-Sheet 2
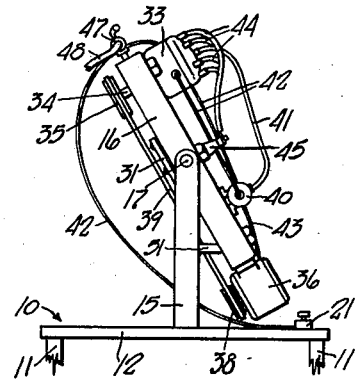
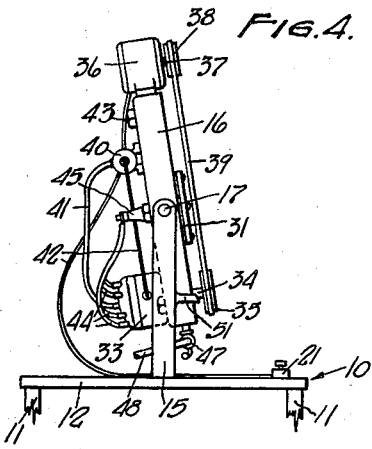
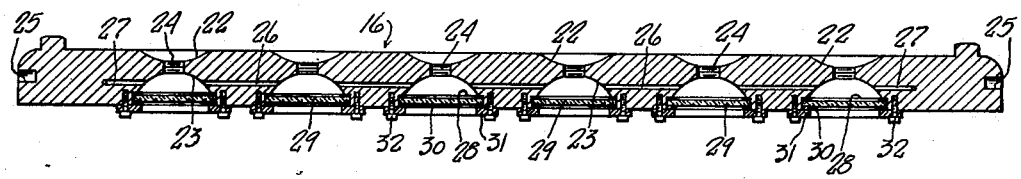
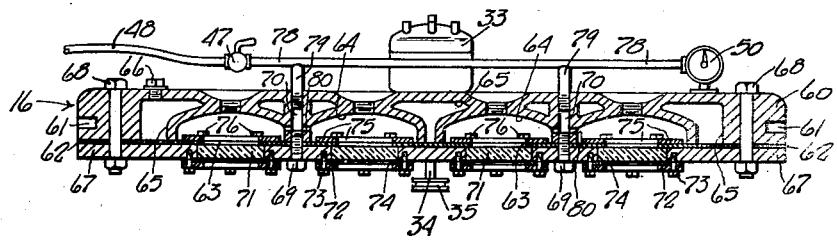
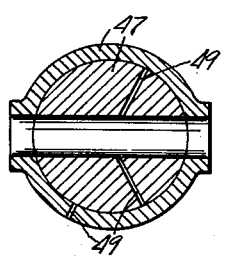
CHARLES FERREL.
JOSEPH G. COLLING.
INVENTORS
BY *Oltsch & Knoblock*
ATTORNEYS.

Patented June 7, 1938

2,119,634

UNITED STATES PATENT OFFICE 2,119,634

SPARK PLUG TESTING DEVICE

Charles Ferrel, Chicago, and Joseph G. Colling, Evanston, Ill.

Application July 1, 1937, Serial No. 151,352

14 Claims. (Cl. 175—183)

This invention relates to spark plug testing devices.

Various types of devices of this character have heretofore been devised by means of which the operating condition of the spark plugs of an internal combustion engine could be tested. Among such devices have been some which were adapted to be attached to the engine at the spark plug port opening and to provide an auxiliary chamber mounting the spark plug and having a sight opening to permit vision of the ignition action in the engine; some which were independent of the engine but provided with sight openings to render the operation of one or more plugs visible; some which were of electrical or other indicating character; and others of various types. In each some difficulty or objection has been found, however, such as obscuring of the spark produced by ignited gases, lack of appreciation by the operator of the meaning of indications obtained; and hesitancy of the operator to accept the results obtained as an accurate test of the plugs.

It is, therefore, the primary object of this invention to provide a device reproducing the operating conditions of an internal combustion engine and conforming closely to the appearance of an engine whereby a person unfamiliar therewith will readily appreciate the true result of a test made therewith.

A further object is to provide a device of this character wherein all engine conditions with respect to ignition, except fuel feeding, are reproduced.

A further object is to provide a device of this character by which comparative tests of two or more plugs may readily be made.

A further object is to provide a device of this character having a plurality of chambers supplied with compressed air and mounting spark plugs whose electrodes are plainly visible through a sight opening, and means for operating the spark plugs in predetermined serial relation.

A further object is to provide a device of this character wherein the operating parts are assembled in unitary relation for pivotal mounting on a support.

A further object is to provide a device of this character having a housing mounting spark plugs and resembling the head of an engine at one side, and having sight openings for viewing the electrodes of the spark plugs at the opposite side, and means for pivotally mounting said housing to selectively expose the opposite housing sides.

A further object is to provide a device of this character of novel, inexpensive and simple construction which is easy to use.

Other objects will be apparent from the description and the appended claims.

In the drawings:

Fig. 3 is a fragmentary side elevational view of the device in one position.

Fig. 4 is a fragmentary side elevational view of the device in another position.

Fig. 5 is a longitudinal sectional view of the housing taken on line 5—5 of Fig. 1.

Fig. 6 is a sectional view of a bleed valve.

Fig. 7 is a longitudinal sectional view of a modified embodiment of the device.

Figure 1:
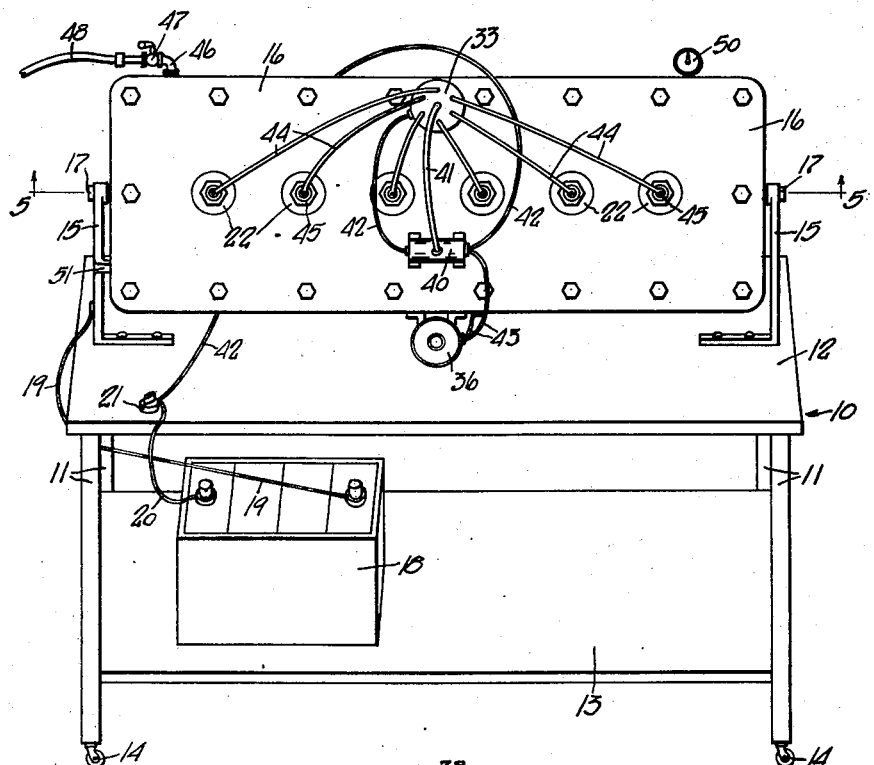
Fig. 1 is a front perspective view of the device, illustrating one face of the pivoted housing.
Figure 2:
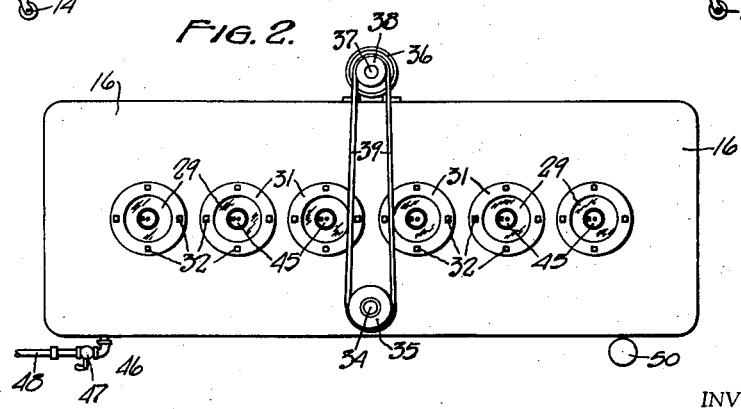
Fig. 2 is a face view of the opposite side of the housing.

Referring to the drawings, and particularly to Figs. 1 to 6, which illustrate the preferred embodiment of the invention, the numeral 10 designates a suitable standard comprising legs 11, a top 12 and a shelf 13. The legs may be mounted on casters 14 if desired. Pivot brackets 15 are fixedly mounted on top 12 in opposed central relation at the opposite ends thereof; and to these brackets a housing 16 is pivoted at 17 at the centers of its ends. Shelf 13 may support a storage battery 18, one terminal of which is grounded to a bracket 15 by means of lead 19. A lead 20 extends from the other battery terminal to a control switch 21 conveniently mounted on the standard, as on top 12.

Housing 16 preferably comprises a metal casting having one face thereof shaped and contoured to simulate the top face of the head of an internal combustion engine, as illustrated in Fig. 1. The construction of this housing is best illustrated in Fig. 5, and comprises an integral cast unit of substantially rectangular outline and comparatively narrow thickness. A series of aligned spaced recesses or wells 22 are formed centrally in one face thereof, and recesses or cavities 23 are formed in the opposite face thereof in concentric relation to recesses 22. A threaded bore 24 connects each pair of concentric recesses. Each of the recesses 23 is provided with a concentric marginal enlargement to provide a stepped marginal contour for purposes to be hereinafter set forth. Aligned recesses 25 are formed in the center of the ends of the housing. A series of longitudinal bores 26 extend between and open recesses 23 into communication, and bores 27 extend from the outermost of said recesses to one of the longitudinal side edges of the housing.

An annular gasket 28 seats in the stepped marginal enlargement of each recess 23, and upon this gasket seats a transparent closure 29 of a strength sufficient to withstand application of high pressure. An outer annular gasket 30 fits against the margin of the outer closure face substantially flush with the housing face, and a locking ring 31 overlapping gasket 30 at its inner margin presses against said gasket and is secured to the housing by suitable bolts 32 secured to the housing in outwardly spaced relation to recess 23. It will be seen that this construction provides a sealed, transparent closure for the outer end of each recess 23.

A conventional distributor 33 is mounted on housing 16 adjacent one side thereof with its shaft 34 journaled in said housing in spaced relation to recesses 22 and 23. A pulley 35 is mounted on the end of shaft 34. An electric motor 36 is mounted on the housing 16, preferably at the edge thereof and opposite the distributor with its shaft 37 parallel to distributor shaft 34. Motor shaft 37 mounts a pulley 38; and a belt 39 runs around pulleys 35 and 38, whereby the motor operates the distributor shaft. A spark coil 40 is mounted on housing 16 adjacent the motor and distributor. High tension lead 41 extends between coil 40 and distributor 33, leads 42 connect said coil and distributor with battery lead 20 controlled by switch 21, and leads 43, one a ground connection, constitute a motor circuit in parallel to circuit 42 and also controlled by switch 21, said ground connection completing the entire operating circuit. The distributor is provided with the usual leads 44 for electrical connection with the spark plugs 45 which are mounted in the threaded bores 24 of the housing.

A fitting 46 provided with a valve 47 is carried by the housing 16 at one edge thereof in communication with one of the bores 27, said fitting being adapted for connection with a conventional flexible conduit 48 extending from an air compressor (not shown). Valve 47 is preferably provided with bleed ports 49, as illustrated in Fig. 6, by means of which the amount of air pressure in the housing may be regulated while the air supply line is closed. An air pressure gauge 50 is mounted on housing 16 in communication with the bore 27 at the opposite end of said housing.

One of the pivot brackets 15 carries an angle-shaped projection 51 adapted to be engaged by housing 16 and constituting a stop for limiting pivoting of said housing to approximately 180 degrees.

In use, the device is preferably positioned as illustrated in Fig. 3, which facilitates insertion of the spark plugs to be tested in the bores 24, and connection of distributor leads 44 to the plugs. When the plugs have been properly inserted so that all of the bores 24 are sealed, valve 47 is opened to supply compressed air to chambers 23. The pressure supplied may be accurately regulated by manipulation of the valve according to the reading on gauge 50, and in the event the pressure supplied exceeds that desired, say 115 pounds pressure, the valve may be manipulated to bleed the pressure through ports 49 which are so arranged as to open the chambered side of the system to atmosphere while closing the supply side. When the desired air pressure has been obtained, the device may be pivoted to the position illustrated in Fig. 4 to expose the electrodes of the plugs to view through the transparent closures 29 for chambers 23. Switch 21 is then operated to close the electrical operating circuit to the motor, coil and distributor and thereby consecutively or serially energize or fire the spark plugs in the conventional manner, the distributor being operated by the belt drive 39 with the motor. The strength of the spark of each spark plug is directly observable, and the comparative strength of the individual plugs can be easily visually determined. Inasmuch as the plugs fire in an atmosphere of compressed air, and the amount of pressure can be regulated as desired, it is obvious that the conditions of operation can be made to substantially correspond to actual operating conditions in an engine, so that a visual convincing and true test is obtained. For purposes of determining the strength of the plugs with respect to desired or normal strength, one or more new spark plugs may be mounted in the device, together with the used plugs being tested, so that the car owner may see for himself just how weak the spark produced by his plugs is, as well as see which of his plugs are weak in comparison to the others. In other words, the device enables a mechanic to so test spark plugs as to let the car owner see for himself the operation of the plugs under actual engine operating conditions, the weakness of individual plugs, or the weakness of all plugs, in such a way that the car owner understands the test and appreciates the need for replacement of such plugs as are ineffective or inadequate. The stop 51 serves to limit rotation of the parts to prevent fouling of the electric leads and air line as might occur if the casing were freely rotatable, and also permits arrangement of the parts in the most compact arrangement, as by reducing the length of the pivot bracket 15 to a dimension less than the dimension between the longitudinal or pivot axis of housing 16 and the outermost point of motor 36, as illustrated in Fig. 3.

If desired, for the purpose of making the device more closely conform to the appearance of an engine, the head 60 of a regular internal combustion engine may be employed, as illustrated in Fig. 7. In this embodiment the head 60 is provided with pivot bores 61 at the center of its ends, adapted for pivot mounting on suitable brackets as above described. A gasket 62 is provided which is unbroken except for openings 63 concentric with each cylinder head portion or chamber 64, and for the necessary bolt openings and the like. This gasket thus serves to seal the water jacket passages 65 from chambers 64. If desired, the water jacket connections may be sealed by plugs 66. A plate 67 having suitable openings concentric with chambers 64 is secured to head 60 by means of bolts 68 passing through the marginal bolt holes of said head, and by means of bolts 69 threaded in the bolt holes 70 in the intermediate portion of head and adjacent the chambers 64, said bolts 69 preferably being short whereby they extend only partially through bolt holes 70.

A glass plate 71 fits closely in each of the openings in plate 67 concentric with chambers 64. These plates 71 are held to place at their outer sides by locking rings 72 of smaller inner diameter than the diameter of plates 71, said locking rings being secured by bolts 73 extending into plate 67 to press them against gasket rings 74 interposed between the rings 72 and the outer faces of plates 67 and 71 at the joints therebetween. Inner locking rings 75 held by bolts 76 extending into plate 67 in staggered relation to bolts 73, and pressing against gasket 62, form an inner seal for each glass plate 67. Thus a sealed transparent closure is provided to permit inspection of the interior of each chamber 24.

A rigid air conduit 78 is provided with branches 79 threaded or otherwise sealed in the upper ends of holes 70 in head 60, said branches serving to hold the conduit 78 in fixed relation to head 60. Conduit 78 is provided with a valve 47 and suitable means for connection with a flexible supply conduit 48 at one end, and is connected with a pressure gauge 50 mounted on the head. Ports 80 are formed in head 60 communicating with holes 70 thereof and the adjacent chambers 64, whereby said chambers 64 communicate with conduits 78 and 79, the bolts 69 serving to seal the lower ends of said holes 70. The head mounts distributor 33 in the conventional manner, the plate 67 being provided with an opening for the shaft 34 thereof which mounts pulley 35. The motor, spark coil, drive belt, electric leads and the like are mounted and arranged on the head in the same manner as hereinabove described.

It will thus be obvious that this modified embodiment provides the same arrangement of pivoted unit with sealed combustion chambers having sight openings, means for supplying the chambers with equal air pressure, and means for operating the distributor and firing the spark plugs, as does the preferred embodiment; and hence is used and operated in the same way and with the same improved results. It will also be obvious that, if desired, the air supply means and air gauge may be conveniently positioned to be operated and viewed when the unit is in testing position, Fig. 4. This is of advantage where tests of the spark plugs at various air pressures are desired, as to determine the point or pressure at which a weak spark plug becomes entirely inoperative.

We claim:

1. A spark plug testing device comprising a support, a housing pivoted to said support, said housing having a sealed firing chamber provided with a sight opening, means for supplying compressed air to said chamber, a spark plug carried by said housing with its electrodes in said chamber, and means carried by said pivoted housing for intermittently energizing said spark plug at predetermined intervals.

2. A spark plug testing device comprising a support, a housing pivoted to said support, said housing having a plurality of firing chambers, a plurality of spark plugs carried by said housing with their electrodes in said chambers, means for supplying equal pressures of compressed air to said chambers, and means carried by said pivoted housing for energizing said spark plugs in predetermined timed relation.

3. A spark plug testing device comprising a support, a housing pivoted to said support, said housing having a plurality of communicating firing chambers, a plurality of spark plugs carried by said housing with their electrodes in said chambers, means for supplying compressed air to said communicating chambers, and means for consecutively energizing said spark plugs including a distributor, spark coil and a motor each carried by said pivoted housing.

4. A spark plug testing device comprising a support, a unit shiftably mounted on said support and having two operating positions, a spark plug carried by said unit and accessible in one operating position, said unit having a sealed chamber into which said spark plug projects, a transparent closure for said chamber visible at the other operating position, means for supplying compressed air to said chamber, and means carried by said shiftable housing for periodically energizing said spark plug.

5. A spark plug testing device comprising a support, a housing pivoted to said support and comprising a sealed chamber, a spark plug carried by said chamber, means for supplying compressed air to said chamber including a flexible conduit, means for intermittently energizing said spark plug including parts carried by said support, parts carried by said housing, and a flexible connection therebetween, and means for limiting the pivoting of said housing on said support to prevent fouling of said conduit and connection.

6. In a spark plug testing device, a support, a housing pivoted on said support and having a chamber with opposed openings, a spark plug mounted in one opening, a transparent closure sealing the other opening, means for positioning said housing to selectively expose said spark plug or sight opening and means for intermittently energizing said spark plug including a plurality of parts carried by said housing on opposite sides of the pivot axis thereof in substantially balanced relation.

7. In a spark plug testing device, a support, a housing shiftable on said support and having a plurality of firing chambers, spark plugs carried by said housing to project into said chambers, means establishing communication between said chambers to equalize pressure therein, a transparent member forming a portion of each chamber, means for sealing the joint between said transparent portion and housing, and means carried by said shiftable housing for intermittently energizing said spark plugs in predetermined timed relation.

8. In a spark plug testing device, a support, a member pivoted to said support and having spaced firing chambers with sight openings, spark plugs carried by said member and each projecting into one of said chambers, and means for operating said spark plugs including a distributor carried by said member and having a rotatable shaft projecting through said member, a motor mounted on said member and having a drive shaft, and transmission means connecting said shafts.

9. The construction defined in claim 8, wherein said motor is mounted on an edge of said member with its shaft parallel to said distributor shaft, and said transmission means comprises a pulley carried by each shaft, and a drive belt between said pulleys.

10. A spark plug testing device, comprising the head of an internal combustion engine having combustion chambers, a water jacket and bolt holes, a closure plate having openings concentric with said chambers, a gasket between said plate and head having openings concentric with said chambers, said gasket sealing said water jacket, transparent closures in said plate openings, means for securing said transparent closures to said plate in sealed relation, and means for supplying compressed air to said chambers.

11. A spark plug testing device comprising the head of an internal combustion engine having combustion chambers, a water jacket and bolt holes, means for sealing said chambers and water jacket and including a transparent portion at each chamber, said head having passages therein between adjacent chambers and bolt holes, means sealing one end of each of said last named bolt holes, and an air conduit communicating with the opposite ends of said last named bolt holes.

12. A spark plug testing device comprising the head of an internal combustion engine having open ended combustion chambers, bolt holes adjacent thereto, and passages extending between said chambers and an intermediate portion of said holes, a closure for the open ends of said chambers, bolts extending into one end of said holes to secure said closure to said head, and an air supply conduit connected with the opposite end of each hole.

13. In a spark plug testing device, a support, a battery carried by said support, a housing pivoted to said support having a chamber and a sight opening, spark plugs carried by said housing opposite said sight opening and projecting into said chamber, a distributor carried by said housing in spaced relation to the pivot axis thereof and to said spark plugs, a motor carried by said housing in spaced opposed relation to said distributor, drive means between said motor and distributor, a spark coil carried by said housing, a switch carried by said support, and conductors electrically connecting said battery, switch, coil, motor and distributor, at least some of said conductors being elongated and flexible to accommodate pivoting of said housing.

14. In a spark plug testing device, a housing having a sealed firing chamber with a sight opening and apertures opposed thereto, a spark plug mounted in each aperture, a distributor, a motor, drive means between said motor and distributor, a spark coil, said distributor, motor and coil being carried by said housing in spaced relation to each other and to said chamber, and means for pivoting said housing in balanced relation whereby said housing may be selectively positioned to expose said spark plugs or sight opening.

CHARLES FERREL.
JOSEPH G. COLLING.